United States Patent
Lefevre et al.

(10) Patent No.: US 10,200,231 B1
(45) Date of Patent: Feb. 5, 2019

(54) PARTIAL PROBABILISTIC SIGNAL SHAPING

(71) Applicant: Nokia Technologies Oy, Espoo (FI)

(72) Inventors: Yannick Lefevre, Kessel-Lo (BE); Joon Ho Cho, Holmdel, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/928,880

(22) Filed: Mar. 22, 2018

(51) Int. Cl.
*H04L 27/34* (2006.01)
*H04L 1/00* (2006.01)
*H04L 27/26* (2006.01)

(52) U.S. Cl.
CPC ........ *H04L 27/3411* (2013.01); *H04L 1/0042* (2013.01); *H04L 27/265* (2013.01); *H04L 27/2628* (2013.01)

(58) Field of Classification Search
CPC ....... H04L 1/00; H04L 27/00; H04L 27/3411; H04L 27/265; H04L 27/2628; H04L 1/0042; H03M 13/00
See application file for complete search history.

(56) References Cited

U.S. PATENT DOCUMENTS

| 7,400,609 B2 | 7/2008 | Hammerschmidt | |
| 8,144,807 B2 * | 3/2012 | Mirfakhraei | H04B 3/32 375/144 |
| 2005/0286620 A1 * | 12/2005 | Peng | H04L 5/14 375/222 |
| 2018/0026725 A1 * | 1/2018 | Cho | H04B 10/564 714/776 |

FOREIGN PATENT DOCUMENTS

WO  WO2010019168 A1  2/2010

OTHER PUBLICATIONS

Forney, G. D. "Trellis shaping." IEEE Transactions on Information Theory 38.2 (1992): 281-300.
Jones, Edward. "Introduction to DSL." Fundamentals of DSL Technology. Auerbach Publications, 2005. 131-154.
(Continued)

*Primary Examiner* — Vineeta S Panwalkar
(74) *Attorney, Agent, or Firm* — Mendelsohn Dunleavy, P.C.; Yuri Gruzdkov

(57) ABSTRACT

A communication system in which probabilistic signal shaping and FEC coding are jointly applied using a partial amplitude-shaping scheme, under which bit-words representing binary labels of the transmitted amplitudes may have (i) a fixed number of amplitude most-significant bits (MSBs) generated using a shaping code and (ii) a fixed number of amplitude least-significant bits (LSBs) generated using an FEC code, e.g., without the shaping code being applied thereto. In various embodiments, the transmitted constellation symbols can carry, as sign bits, some original information bits and/or the parity bits generated by FEC-encoding some combination of the MSBs, the LSBs, and said some original information bits. Some embodiments are compatible with convolutional FEC codes, such as the trellis-coded modulation. Some embodiments can be used in communication systems relying on discrete multi-tone modulation, such as the systems providing DSL access over subscriber lines.

17 Claims, 12 Drawing Sheets

(56) References Cited

OTHER PUBLICATIONS

Stojković, Nino. "ADSL analogno sučelje." Automatika: časopis za automatiku, mjerenje, elektroniku, računarstvo i komunikacije 47.1-2 (2006): 59-67.
Arafa, T., W. Sauer-Greff, and R. Urbansky. "Performance of combined constellation shaping and bit interleaved coded modulation with iterative decoding (bicm-id)." Advances in Radio Science: ARS 9 (2011): 195.
Amjad, Rana Ali, and Georg Böcherer. "Fixed-to-variable length distribution matching." Information Theory Proceedings (ISIT), 2013 IEEE International Symposium on. IEEE, 2013.
Peng, Linning, Maryline Hélard, and Sylvain Haese. "On bit-loading for discrete multi-tone transmission over short range POF systems." Journal of lightwave technology 31.24 (2013): 4155-4165.
Böcherer, Georg, Fabian Steiner, and Patrick Schulte. "Bandwidth efficient and rate-matched low-density parity-check coded modulation." IEEE Transactions on Communications 63.12 (2015): 4651-4665.
Schulte, Patrick, and Georg Böcherer. "Constant composition distribution matching." IEEE Transactions on Information Theory 62.1 (2016): 430-434.
Pan, Chunpo, and Frank R. Kschischang. "Probabilistic 16-QAM shaping in WDM systems." Journal of Lightwave Technology 34.18 (2016): 4285-4292.
Fehenberger, Tobias, et al. "On probabilistic shaping of quadrature amplitude modulation for the nonlinear fiber channel." Journal of Lightwave Technology 34.21 (2016): 5063-5073.
Cho, Junho, et al. "Trans-Atlantic field trial using probabilistically shaped 64-QAM at high spectral efficiencies and single-carrier real-time 250-Gb/s 16-QAM." Optical Fiber Communication Conference. Optical Society of America, 2017.
Camps, C., et al., "Evaluation of G.hn: Agreement to Support the Generic Multi Level Coding Scheme," Study Group 15, ITU—Telecommunication Standardization Sector, Temporary Document 2017-01-Q18-023, Jan. 2017, pp. 1-8.
Wei, D., "G.fast: Performance of LDPC Coded Modulation," Study Group 15, ITU—Telecommunication Standardization Sector, Temporary Document 2017-02-Q4-034, Feb. 2017, 6 pages.
Böcherer, G., et al., "High throughput probabilistic shaping with product distribution matching." arXiv preprint arXiv:1702.07510 (2017).
Idler, W., et al. "Field Trial of a 1 Tb/s Super-Channel Network Using Probabilistically Shaped Constellations." Journal of Lightwave Technology 35.8 (2017): 1399-1406.
Wei, D., "G.mgfast: Constellation Shaping on LDPC Coded Modulation," Study Group 15, International Telecommunication Union, Telecommunication Standardization Sector, Sep. 2017, pp. 1-6.
Cho, J.H., et al., "Probabilistic Signal Shaping and Codes Therefor," U.S. Appl. No. 15/374,397, filed Dec. 9, 2016; 43 pages.
Lefevre, Y., "Joint Use of Probabilistic Signal Shaping and Forward Error Correction," U.S. Appl. No. 15/817,516, filed Nov. 20, 2017; 52 pages.
Lefevre, Y., "Multi-Code Probabilistic Signal Shaping Using Frequency Division Multiplexing," U.S. Appl. No. 15/817,537, filed Nov. 20, 2017; 72 pages.

\* cited by examiner

100

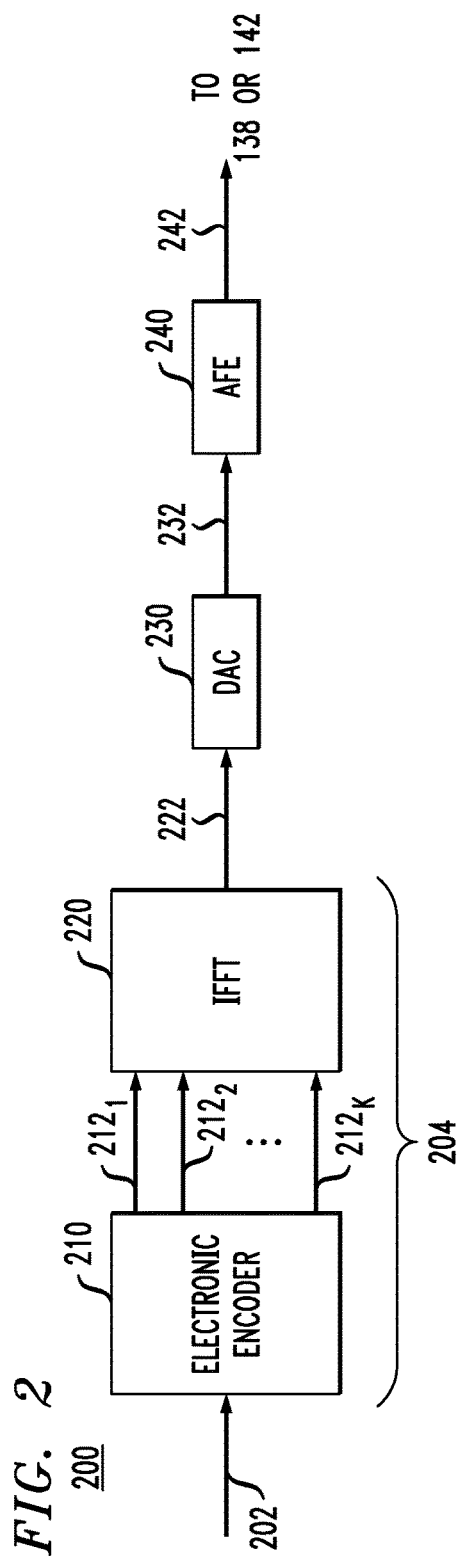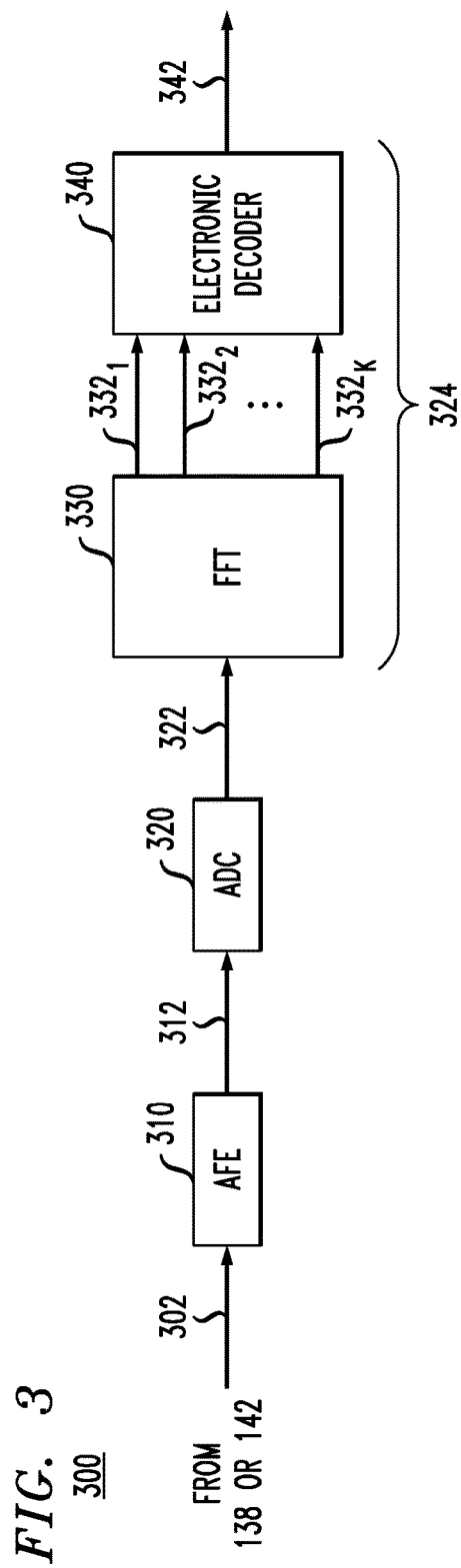

410

420

700

800

900

1000

1100

1200

1300

PARTIAL PROBABILISTIC SIGNAL SHAPING

BACKGROUND

Field

Various example embodiments relate to optical communication equipment and, more specifically but not exclusively, to methods and apparatus for transmitting and receiving communication signals using probabilistic signal shaping and forward error correction (FEC).

Description of the Related Art

This section introduces aspects that may help facilitate a better understanding of the disclosure. Accordingly, the statements of this section are to be read in this light and are not to be understood as admissions about what is in the prior art or what is not in the prior art.

Signal shaping can provide energy savings often referred to as the shaping gain. In a typical implementation of signal shaping, constellation symbols of relatively large energy are transmitted less frequently than constellation symbols of relatively small energy. For a linear communication channel, the shaping gain can theoretically approach 1.53 dB.

Frequency-division multiplexing (FDM) is a method of transmitting data on multiple carrier frequencies that can be used in wireline, wireless, and optical communication channels. Different variants of FDM are used in various forms of wideband digital communications, digital television, audio broadcasting, digital subscriber line (DSL) or G.fast Internet access, local area networks (LANs), home networks, 4G mobile-access networks, etc. Some variants of FDM, typically collectively referred to as discrete multi-tone (DMT) modulation, are used in wireline communication channels established over, e.g., plain old telephone service (POTS) copper wiring, coaxial cable, and/or power lines. Some FDM schemes use orthogonal frequency-division multiplexing (OFDM).

At least some communication systems can benefit from the use of various combinations of signal shaping, forward error correction, and/or frequency-division multiplexing.

SUMMARY OF SOME SPECIFIC EMBODIMENTS

Disclosed herein are various embodiments of a communication system in which probabilistic signal shaping and FEC coding are jointly applied using a partial amplitude-shaping scheme, in accordance with an example embodiment of which bit-words representing binary labels of the transmitted amplitudes have (i) a fixed number of amplitude most-significant bits (MSBs) generated using a shaping code and (ii) a fixed number of amplitude least-significant bits (LSBs) generated using an FEC code, e.g., without the shaping code being applied thereto. As a result, at least some conventional limitations pertaining to the rate of the FEC code can advantageously be eased or removed.

In various embodiments, the transmitted constellation symbols can carry, as sign bits, some original information bits and/or the parity bits generated by FEC-encoding some combination of the MSBs, the LSBs, and said some original information bits.

Some embodiments are compatible with convolutional FEC codes, such as the trellis-coded modulation.

In some embodiments, not all of the amplitude LSBs are generated (as parity or transformed bits) by the FEC code. For example, although all of the amplitude LSBs may typically be protected using the FEC code, only some of them may be generated (e.g., as parity bits) by the FEC code.

Some embodiments can be used in communication systems relying on discrete multi-tone modulation, such as the systems providing DSL access over subscriber lines.

According to an example embodiment, provided is an apparatus comprising a data transmitter that comprises an electrical analog front end and a digital signal processor, the digital signal processor being configured to: redundancy-encode an input data stream to generate a first constellation-symbol stream; and drive the analog front end to cause one or more modulated electrical carriers generated by the analog front end to carry constellation symbols of the first constellation-symbol stream; and wherein the digital signal processor comprises: a first demultiplexer configured to demultiplex the input data stream to generate a first sub-stream and a second sub-stream; a shaping encoder configured to generate a first encoded data stream by applying a shaping code to the first sub-stream; one or more FEC encoders configured to generate a second encoded data stream by applying one or more FEC codes to the second sub-stream; and a constellation mapper configured to use the first and second encoded data streams to select constellation-symbol amplitudes for the first constellation-symbol stream.

According to another example embodiment, provided is an apparatus comprising a data receiver that comprises an electrical analog front end and a digital signal processor, the digital signal processor being configured to process a first stream of values representing one or more modulated carriers of a received electrical signal outputted by the electrical analog front end and corresponding to a first stream of transmitted constellation symbols, the digital signal processor being configured to redundancy-decode the first stream of values to recover a source data stream redundancy-encoded in the first stream of transmitted constellation symbols and carried by the one or more modulated electrical carriers; and wherein the digital signal processor comprises: a constellation demapper configured to generate a first data stream by matching each of the first stream of values with at least one constellation point, the first data stream being indicative of amplitude LSBs of binary labels of the first constellation-symbol stream and having a fixed number of amplitude LSBs per binary label; one or more FEC decoders configured to generate a second data stream by redundancy-decoding the first data stream, the redundancy-decoding being performed using one or more FEC codes; a shaping decoder configured to generate a third data stream by decoding a stream of bit-words indicative of amplitude MSBs of binary labels of the first constellation-symbol stream and having a fixed number of amplitude MSBs per binary label, the stream of bit-words being generated by processing the first stream of values, the decoding being performed using a shaping code; and a multiplexer configured to multiplex the second and third data streams to recover the source data stream.

BRIEF DESCRIPTION OF THE DRAWINGS

Other aspects, features, and benefits of various disclosed embodiments will become more fully apparent, by way of example, from the following detailed description and the accompanying drawings, in which:

FIG. 2 shows a block diagram of a transmitter that can be used in the DMT system of FIG. 1 according to an embodiment;

FIG. 3 shows a block diagram of a receiver that can be used in the DMT system of FIG. 1 according to an embodiment;

DETAILED DESCRIPTION

Figure 1:
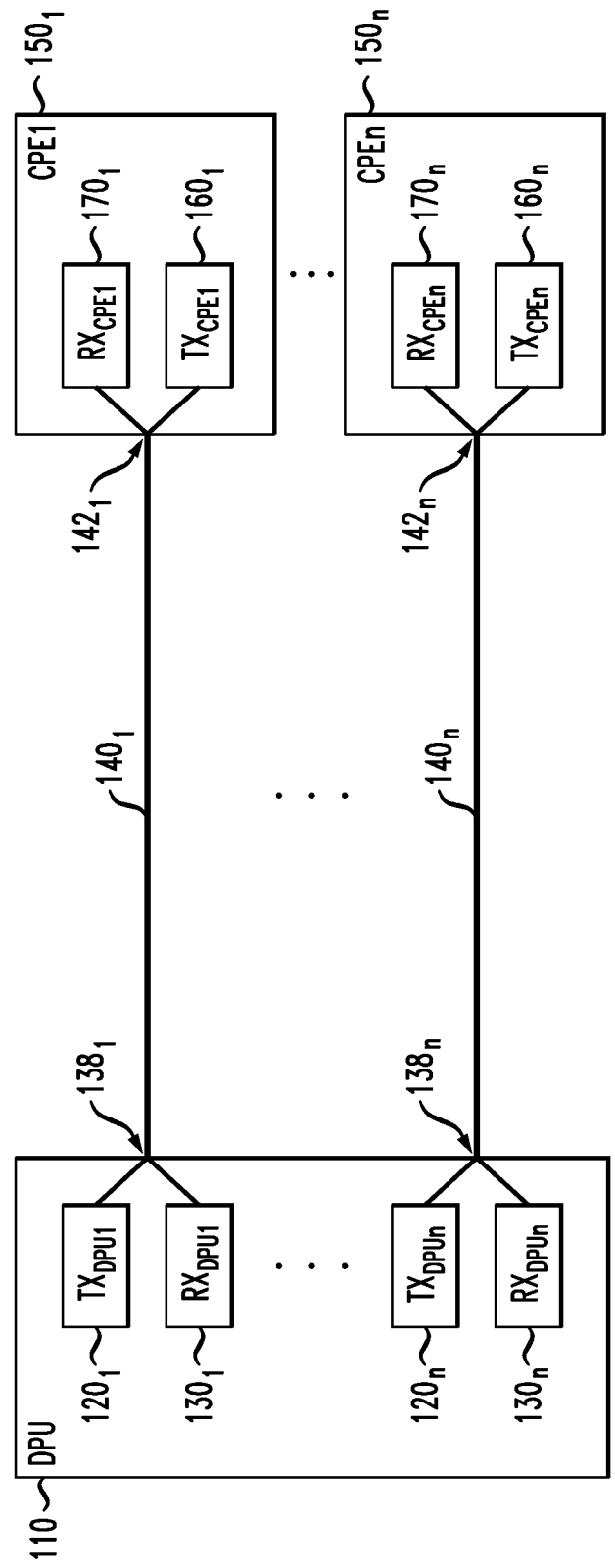
FIG. 1 shows a block diagram of a DMT system in which various embodiments can be practiced.

Some embodiments disclosed herein may benefit from the use of at least some features disclosed in U.S. patent application Ser. Nos. 15/817,516 and 15/817,537, both of which are incorporated herein by reference in their entirety.

The following acronyms/abbreviations are used in the description of various embodiments and/or in the accompanying drawings:

ADC Analog-to-Digital Converter;
AFE Analog Front End;
CPE Customer Premise Equipment;
CRC Cyclic Redundancy Check;
DAC Digital-to-Analog Converter;
DMT Discrete Multi-Tone;
DMUX Demultiplexer;
DPU Distribution Point Unit;
DSP Digital Signal Processor;
DSL Digital Subscriber Line;
DTU Data Transfer Unit;
FDM Frequency-Division Multiplexing;
FEC Forward Error Correction;
FFT Fast Fourier Transform;
FIFO First-In/First-Out;
IFFT Inverse Fast Fourier Transform;
IQ In-phase/Quadrature;
I/O Input/Output;
LAN Local Area Network;
LDPC Low Density Parity Check;
LLR Log-Likelihood Ratio;
LSB Least-Significant Bit;
LUT Look-Up Table;
MSB Most-Significant Bit;
MUX Multiplexer;
OFDM Orthogonal Frequency-Division Multiplexing;
PAM Pulse Amplitude Modulation;
POTS Plain Old Telephone Service;
QAM Quadrature Amplitude Modulation;
RF Radio Frequency;
RS Reed Solomon;
SNR Signal-to-Noise Ratio; and
TCM Trellis-Coded Modulation.

Conventional probabilistic signal-shaping schemes may significantly limit the manner in which forward error correction (FEC) can be used therein. For example, a typical conventional probabilistic signal-shaping scheme may only be compatible with systematic FEC codes. In addition, for any given pulse-amplitude-modulation (PAM) constellation, a conventional probabilistic signal-shaping scheme may constrain the rate R of the FEC code in accordance with the following inequality:

$$R \geq 1 - \frac{1}{m} \quad (1)$$

where m is the modulation order; and $2^m$ is the number of constellation points in (the size of) the PAM constellation.

At least some of the above-indicated problems in the state of the art are addressed by example embodiments employing a partial amplitude-shaping scheme, under which bit-words representing binary labels of the transmitted amplitudes have (i) a fixed number $m_s$ of amplitude most-significant bits (MSBs) generated using a shaping code, where $m_s$ is a positive integer, and (ii) a fixed number $m_u$ of amplitude least-significant bits (LSBs) generated using an FEC code, e.g., without the shaping code being applied thereto, where $m_u$ is a positive integer. In some embodiments, not all of the amplitude LSBs are generated (as parity or transformed bits) by the FEC code. For example, although all of the amplitude LSBs may typically be protected using the FEC code, only some of them may be generated (e.g., as parity bits) by the FEC code. Under various embodiments of this partial amplitude-shaping scheme, at least some of the above-indicated limitations pertaining to the FEC code are eased or removed. For example, some embodiments are compatible with convolutional FEC codes, such as the trellis-coded modulation (TCM). In at least some embodiments, the rate R of the FEC code is not constrained in accordance with Eq. (1).

FIG. 1 shows a block diagram of a DMT system 100 in which various embodiments can be practiced. System 100 comprises a distribution point unit (DPU) 110 and a plurality of customer-premise-equipment (CPE) units $150_1$-$150_n$, connected by way of subscriber lines $140_1$-$140_n$, as indicated in FIG. 1. In some embodiments, DPU 110 may be located at a "central office" of the service provider (e.g., a telephone company). In some other embodiments, DPU 110 may be remotely deployed using one or more backhaul (e.g., optical) links to a location that is closer to the subscriber premises than that of the central office, and the corresponding equipment can be physically placed in a street cabinet, on a pole, in the basement of a building, etc. CPE units $150_1$-$150_n$ are typically located at different respective customer sites.

Each of subscriber lines $140_1$-$140_n$ typically comprises a respective "twisted-pair" (or other suitable) cable configured to transmit signals corresponding to voice and/or data services. At DPU 110, each of subscriber lines $140_1$-$140_n$ is connected to a respective one of input/output (I/O) ports $138_1$-$138_n$. At the CPE side, each of subscriber lines $140_1$-$140_n$ is similarly connected to a respective one of I/O ports $142_1$-$142_n$, each being an I/O port of a respective one of CPE units $150_1$-$150_n$.

In an example embodiment, DPU 110 comprises a plurality of transceivers ($120_i/130_i$), each internally connected to a respective one of I/O ports $142_1$-$142_n$, where i=1, 2, . . . , n. A transceiver ($120_i/130_i$) includes a respective transmitter $120i$ and a respective receiver $130_i$. A CPE unit $150_i$ comprises a transceiver ($160_i/170_i$) internally connected to I/O port $142_i$ of that CPE unit. A transceiver ($160_i/170_i$) includes a respective transmitter $160_i$ and a respective receiver $170_i$. Transmitter $160_i$ can be functionally similar to transmitter $120_i$. Receiver $170_i$ can be functionally similar to receiver $130_i$. Example embodiments of transmitters 120, 160 are described in more detail below in reference to FIGS. 2, 7, 8, 10, and 12. Example embodiments of receivers 130, 170 are described in more detail below in reference to FIGS. 3, 9, 11, and 13.

FIG. 2 shows a block diagram of a transmitter 200 that can be used in system 100 (FIG. 1) according to an embodiment. Transmitter 200 comprises a digital signal processor (DSP) 204, a digital-to-analog converter (DAC) 230, and an analog front end (AFE) 240.

Different instances of transmitter 200 can be used to implement some or all of transmitters $120_1$-$120_n$ and/or $160_1$-$160_n$ (FIG. 1).

DSP 204 operates to carry out data encoding and digital carrier multiplexing to generate a digital output signal 222 having encoded thereon an input data stream 202. DAC 230 operates to convert digital signal 222 into an analog form to generate a corresponding analog electrical signal 232. AFE 240 then converts signal 232 into a form suitable for transmission over a subscriber line 140 and applies a resulting modulated electrical signal 242 to a corresponding I/O port 138 or 142.

In an example embodiment, DSP 204 comprises an electronic encoder 210 and an inverse fast-Fourier-transform (IFFT) module 220. Electronic encoder 210 carries out data encoding that includes, inter alia, probabilistic signal shaping, FEC encoding, and constellation and carrier mapping to generate constellation-symbol sequences $212_1$-$212_K$, each carrying constellation symbols intended for transmission using a different respective tone (carrier wave) of a different respective frequency. IFFT module 220 then uses an inverse Fourier transform, as known in the pertinent art, to perform digital carrier multiplexing, thereby converting sequences $212_1$-$212_K$ into a corresponding time-domain digital signal 222. Depending on the specific embodiment, the number K of tones used in transmitter 200 can be on the order of one hundred, one thousand, or even greater than one thousand.

Example embodiments of electronic encoder 210 are described in more detail below in reference to FIGS. 7, 8, 10, and 12.

AFE 240 can be a conventional transmitter AFE circuit. Example transmitter AFE circuits suitable for implementing AFE 240 are briefly reviewed, e.g., by N. Stojkovic in "ADSL Analog Front End," AUTOMATIKA v. 47 (2006), no. 1-2, pp. 59-67, which is incorporated herein by reference in its entirety.

FIG. 3 shows a block diagram of a receiver 300 that can be used in system 100 (FIG. 1) according to an embodiment. Receiver 300 comprises an AFE 310, an analog-to-digital converter (ADC) 320, and a DSP 324. Different instances of receiver 300 can be used to implement some or all of receivers $130_1$-$130_n$ and/or $170_1$-$170_n$ (FIG. 1).

AFE 310 operates to convert a modulated electrical input signal 302 received through a corresponding I/O port 138 or 142 into a corresponding analog electrical RF signal 312 suitable for digitization in ADC 320. The typical analog signal processing applied to input signal 302 in AFE 310 includes amplification and filtering. Example receiver AFE circuits suitable for implementing AFE 310 are briefly reviewed, e.g., in the above-cited paper by N. Stojkovic. In some embodiments, an AFE 310 and an AFE 240 belonging to the same transceiver or modem can share some circuit elements, such as a clocking system and an electrical hybrid.

ADC 320 operates to sample signal 312 at an appropriate sampling rate to generate a corresponding sequence 322 of digital samples (values).

In an example embodiment, DSP 324 comprises a fast-Fourier-transform (FFT) module 330 and an electronic decoder 340. FFT module 330 uses a Fourier transform, as known in the pertinent art, to perform digital carrier de-multiplexing, thereby converting sequence 322 into the corresponding frequency-domain digital sequences $332_1$-$332_K$. Electronic decoder 340 then applies constellation and carrier demapping, error correction, and decoding to recover the data stream 202 encoded by the corresponding transmitter onto the output signal 242 that caused receiver 300 to receive input signal 302 (also see FIG. 2). The recovered data stream 202 is then directed to external circuits by way of a digital output signal 342.

Example embodiments of electronic decoder 340 are described in more detail below in reference to FIGS. 9, 11, and 13.

Figure 4A:
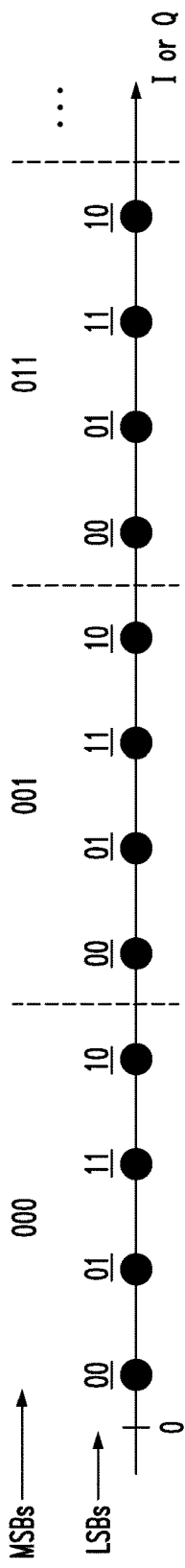
FIGS. 4A-4B graphically illustrate constellation mapping that can be used in the transmitter of FIG. 2 according to some example embodiments.
Figure 4B:
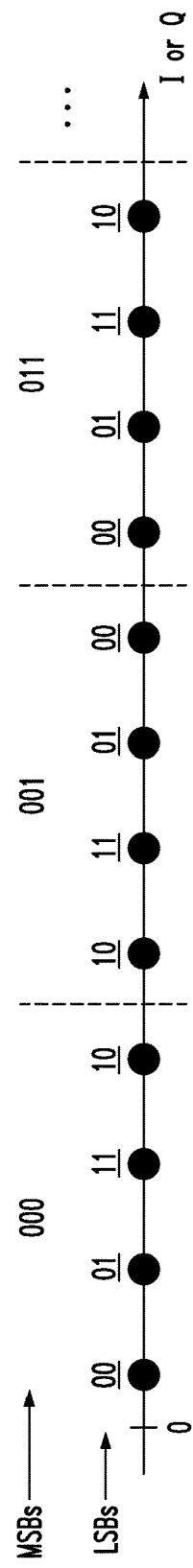

FIGS. 4A-4B graphically illustrate constellation mapping that can be performed by electronic encoder 210 (FIG. 2) according to some example embodiments. Both of the shown examples use a 64-PAM constellation (i.e., the modulation order m=6; the constellation size $2^6$=64) in which the binary labels of the constellation points have one sign bit and five amplitude bits (i.e., $m_a$=5).

Different amplitude bits of the binary label can be assigned different respective "significance" in terms of the overall value of the binary label. For example, the assignment can be such that changing, from "1" to "0" or from "0" to "1," the value of a more significant bit leads, on average, to a constellation point that is farther away from the original constellation point compared to when the same is done for a less significant bit. In this manner, the amplitude bits can be parsed into non-overlapping sets of LSBs and MSBs.

In an example embodiment, the binary labels are assigned to the constellation points using a reflected mapping scheme, in which the amplitude labels (i.e., the parts of the binary labels that do not include the sign bits) are symmetric, and the sign bits of the constellation points are anti-symmetric with respect to the origin of the amplitude axis. This approach can be used to generate binary labels for a constellation or a constellation portion that uses either the I dimension or the Q dimension of the complex plane. Two PAM constellations (one in the I dimension and the other in the Q dimension) can be combined to generate a corresponding QAM constellation, e.g., as explained in the above-cited U.S. patent application Ser. No. 15/817,516.

For brevity, each of FIGS. 4A-4B shows only twelve of the sixty-four constellation points. From the provided description, a person of ordinary skill in the art will understand how to assign binary labels to the remaining (not shown) fifty-two constellation points and how to generate alternative suitable assignments of binary labels.

The five amplitude bits of each binary label are parsed into three LSBs and two MSBs. In the above-indicated nomenclature, this parsing corresponds to $m_s=3$ and $m_u=2$, where $m_s+m_u=m_a=m-1$. The constellation points located on the positive half of the axis are divided into eight groups of four. Due to the above-indicated symmetry, the same grouping applies to the constellation points located on the negative half of the axis. The four constellation points of the each group share the same MSB value and have different respective LSB values, e.g., as indicated in FIGS. 4A-4B.

In the 64-PAM constellation 410 of FIG. 4A, the LSB values are repeated in the same order in each group.

In the 64-PAM constellation 420 of FIG. 4B, the order in which the LSB values appear within each particular group is alternated. For example, the "001" MSB group has a reverse sequence of LSB values compared to that of the "000" MSB group (see FIG. 4B). The "011" MSB group has a reverse sequence of LSB values compared to that of the "001" MSB group (also see FIG. 4B), and so on.

In an example embodiment, a partial amplitude-shaping scheme can be configured to use the 64-PAM constellation 410 or 420 such that (i) the three-bit MSB values of the five-bit bit-words mapped onto the amplitudes are generated using a shaping code and (ii) the two-bit LSB values of the five-bit bit-words mapped onto the amplitudes are generated using an FEC code. As already indicated above, in some embodiments, not all of the amplitude LSBs are generated (as parity or transformed bits) by the FEC code. Electrical circuits that can be adapted for these purposes are described in more detail below in reference to FIGS. 7, 8, 10, and 12.

Figure 5:
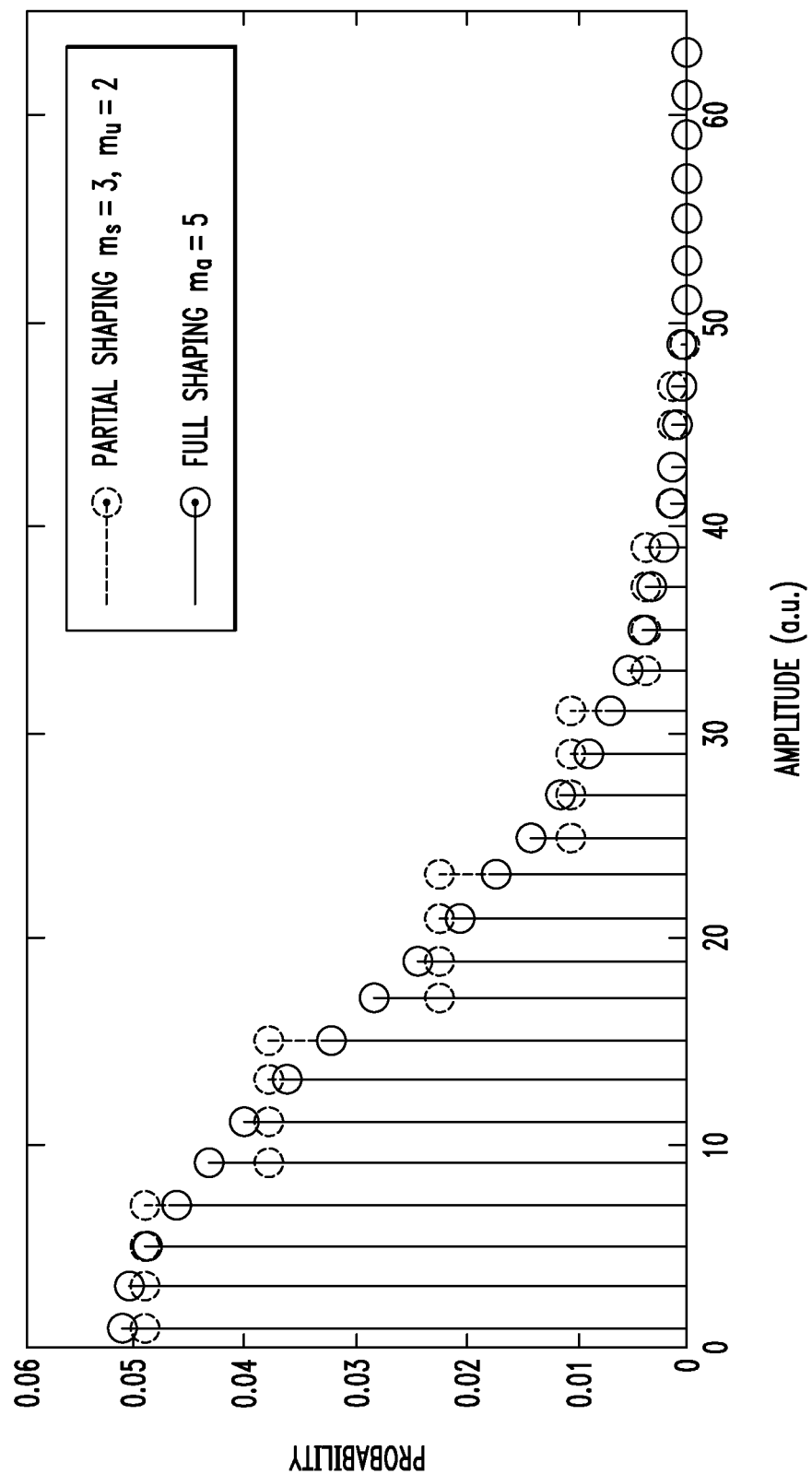
FIG. 5 graphically shows an amplitude probability distribution that can be obtained for a constellation of FIG. 4 using a partial amplitude-shaping scheme according to an example embodiment.

FIG. 5 graphically shows an amplitude probability distribution for the 64-PAM constellation 410 or 420 that can be obtained using a partial amplitude-shaping scheme corresponding to $m_s=3$ and $m_u=2$ according to an example embodiment. As a reference, FIG. 5 also shows an amplitude probability distribution for a 64-PAM constellation obtained using a "full" amplitude-shaping scheme under which all five amplitude bits (i.e., $m_u=0$) are generated using a shaping code configured to generate a Maxwell-Boltzmann-like distribution.

As can be seen from the comparison of the two probability distributions shown in FIG. 5, the illustrated example of the partial amplitude-shaping scheme approximates the reference distribution by a step function, wherein each step represents a corresponding pair of the constellation-point groups (one group from the positive half of the amplitude axis and the corresponding symmetric group from the negative half of the amplitude axis) that share the same MSB value. The step function has eight steps (i.e., $2^3$ for $m_s=3$), each step including four respective amplitudes (i.e., $2^2$ for $m_u=2$) having the same constant probability of occurrence. The probability decreases in a step-like manner as the amplitude value crosses the boundary between two adjacent groups of amplitudes.

Figure 6:
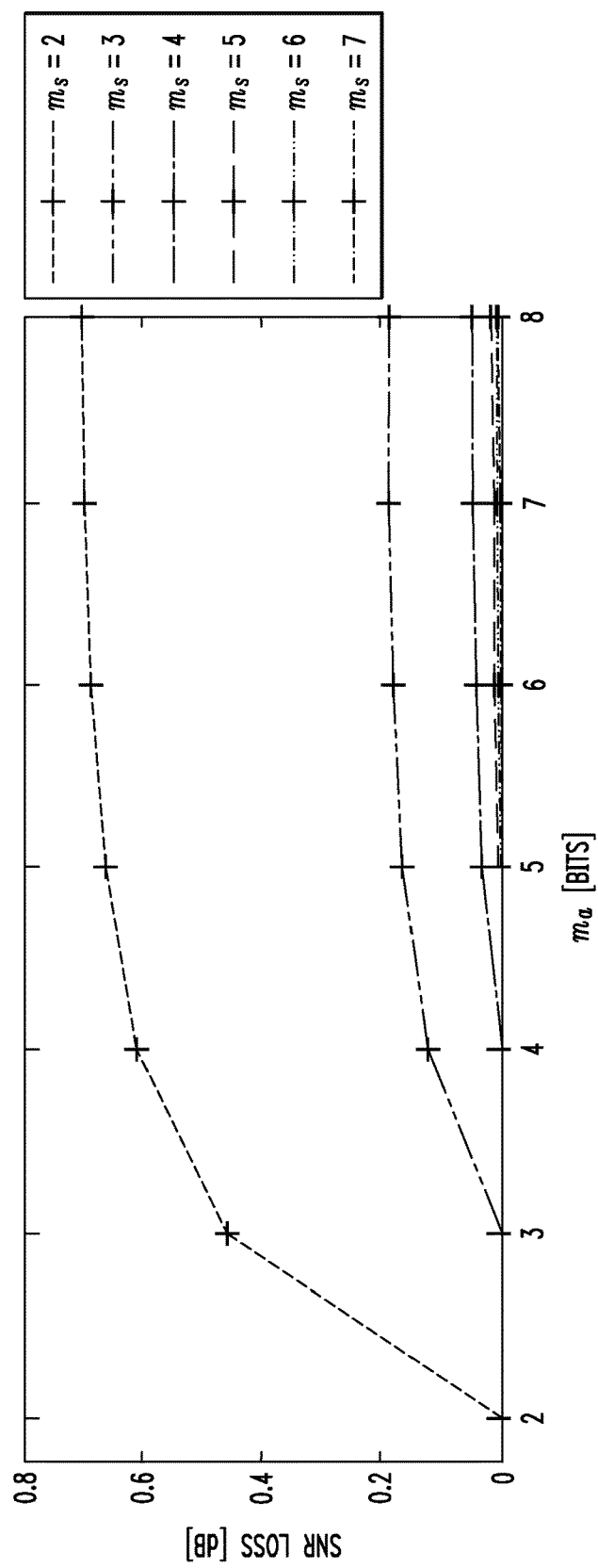
FIG. 6 graphically shows SNR characteristics of a partial amplitude-shaping scheme according to an example embodiment.

FIG. 6 graphically shows SNR characteristics of a partial amplitude-shaping scheme according to an example embodiment. More specifically, each data point in FIG. 6 was obtained using computer simulations and represents a different respective combination of $m_s$, $m_u$, and $m_a$, where $m_s+m_u=m_a=m-1$, with the operative constellation being the $2^m$-PAM constellation. The abscissa of the graph shows the $m_a$ values. The $m_s$ values are shown in the legend box. The corresponding $m_u$ values can be deduced using the following formula: $m_u=m_a-m_s$. The ordinate of the graph shows the SNR loss with respect to the corresponding full-shaping scheme (i.e., $m_u=0$) configured to generate the corresponding Maxwell-Boltzmann-like distribution, an example of which is shown FIG. 5.

Inspection of the data shown in FIG. 6 reveals that the SNR loss can be relatively high (e.g., up to 0.7 dB) for $m_s=2$. However, the SNR loss quickly decreases with the increase of $m_s$. The SNR loss becomes practically negligible for $m_s>3$. Under the latter constrain, the partial shaping can advantageously provide an important practical advantage over the corresponding full shaping because it enables a significant reduction in the complexity of the shaping encoder and decoder. For example, an approximately ten-times reduction in the size of the employed look-up tables (LUTs) can be achieved in some embodiments.

Figure 7:
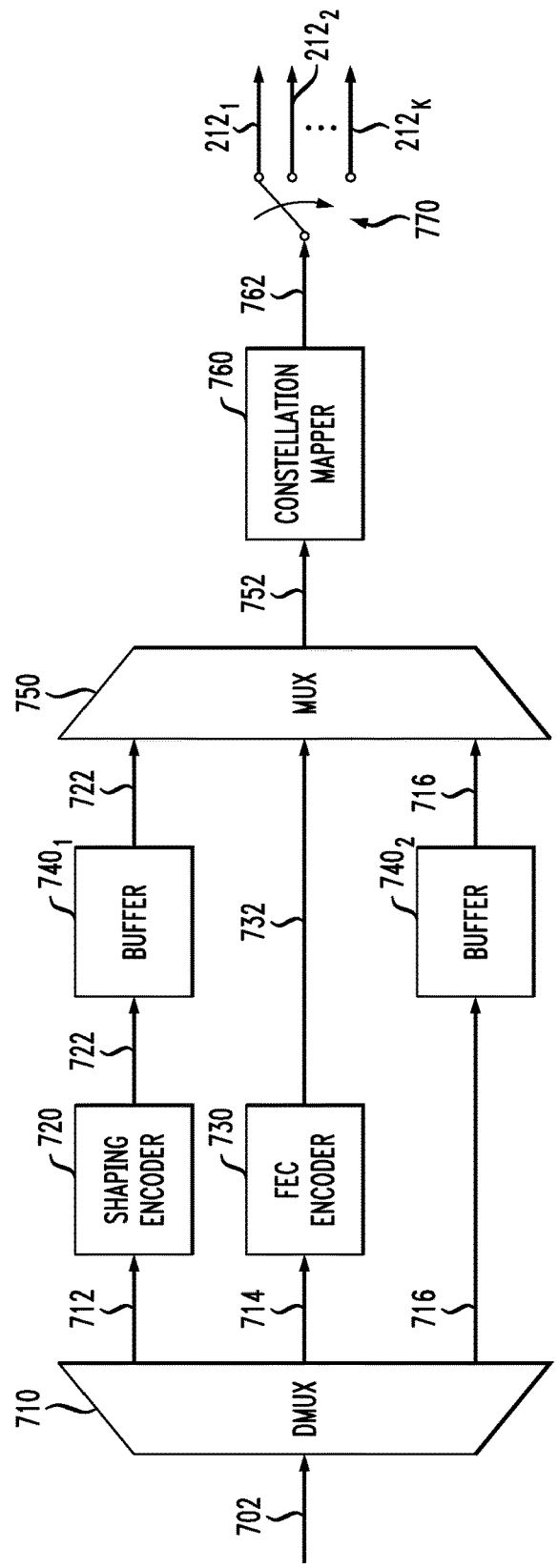
FIG. 7 shows a block diagram of a digital circuit that can be used in the transmitter of FIG. 2 according to an embodiment.

FIG. 7 shows a block diagram of a digital circuit 700 that can be used in transmitter 200 (FIG. 2) according to an embodiment. More specifically, circuit 700 can be a part of electronic encoder 210 (FIG. 2). In operation, circuit 700 generates constellation-symbol sequences $212_1$-$212_K$ (also see FIG. 2).

Circuit 700 comprises a demultiplexer (DMUX) 710, a shaping encoder (distribution matcher) 720, an FEC encoder 730, optional buffers 740$_1$ and 740$_2$, a multiplexer (MUX) 750, a constellation mapper 760, and a K-way switch 770.

DMUX 710 operates to partition an input data stream 702 to generate data streams 712, 714, and 716. Data stream 712 is applied to shaping encoder 720. Data stream 714 is applied to FEC encoder 730. Data stream 716 is applied to MUX 750 through buffer 740$_2$. The relative bit rates of data streams 712, 714, and 716 depend on the rates of the codes used by shaping encoder 720 and FEC encoder 730 and are selected such that the relative bit rates of data streams 722, 732, and 716 applied to MUX 750 are as follows: $m_s:m_u:1$. In some embodiments, the rates of the codes used by shaping encoder 720 and FEC encoder 730 can also be selected such that a first integer number of shaping-code frames and a second integer number of FEC-code frames can be exactly matched to a third integer number of DMT symbols. In some embodiments, the third integer number can be one.

As used herein, the term "DMT symbol" refers to a time-dependent portion of signal 222 (FIG. 2) generated using a set of constellation symbols provided by sequences $212_1$-$212_K$ in the same single signaling interval (time slot), with the duration of the signaling interval being such that it can accommodate a single (e.g., QAM or PAM) constellation symbol per tone.

Input data stream 702 may be configured to carry data transfer units (DTUs), each of which is a structured data block intended for transmission and, if necessary, retransmission as a whole unit. A typical DTU includes a DTU header, a payload portion, and a cyclic-redundancy-check (CRC) portion. In some embodiments, data stream 702 may not carry an entire DTU. A person of ordinary skill in the art will readily understand how to generate input data stream 702 using input data stream 202 (FIG. 2).

Shaping encoder 720 is configured to carry out probabilistic signal shaping under which an input block of source bits provided by data stream 712 is converted into a set of bit-words of an output sequence 722. Each bit-word of sequence 722 has a length of $m_s$ bits and is configured to provide $m_s$ amplitude MSBs for the selection of a corresponding constellation symbol performed by mapper 760, e.g., as explained above in reference to FIGS. 4A-4B. Typically, the statistical properties of data stream 712 are similar to those of a random or pseudo-random bit sequence. However, different bit-word values in sequence 722 have different respective rates of occurrence dictated by the operative shaping code used by shaping encoder 720.

Example shaping codes of different bit-word/codeword lengths that can be used in shaping encoder 720 in the above-indicated manner are the prefix-free codes disclosed in U.S. patent application Ser. No. 15/374,397, which is incorporated herein by reference in its entirety. These codes are "prefix-free" in the sense that no codeword of the shaping code is a prefix of another codeword. Some examples of distributions that can be produced by different shaping codes include, but are not limited to those approximating an exponential distribution, a Gaussian distribution, and a Maxwell-Boltzmann distribution. In an example embodiment, a resulting approximation of the distribution function can be analogous to that provided by the step function graphically shown in FIG. 5.

FEC encoder 730 is configured to use an operative FEC code to introduce redundancy into data stream 714, thereby converting it into data stream 732. Due to the introduced data redundancy, data stream 732 has a higher effective bit rate than data stream 714. In some embodiments, the operative FEC code can be a convolutional code. In some other embodiments, the operative FEC code can be a systematic FEC code, such as a low-density parity-check (LDPC) code. Data stream 732 is such that it can be parsed into bit-words, each having a length of $m_u$ bits and configured to provide $m_u$ amplitude LSBs for the selection of a corresponding constellation symbol performed by mapper 760, e.g., as explained above in reference to FIGS. 4A-4B.

Optional buffers $740_1$ and $740_2$ are first-in/first-out (FIFO) buffers that can temporarily store sequence 722 and data stream 716, respectively. When present, buffers $740_1$ and $740_2$ can be configured, e.g., to appropriately compensate for the different latencies of the three data paths between DMUX 710 and MUX 750. The shown placement of buffers $740_1$ and $740_2$ corresponds to an embodiment in which FEC encoder 730 has a higher processing latency than shaping encoder 720. A person of ordinary skill in the art will understand how to change the buffer placement for other relative latencies of the three data paths between DMUX 710 and MUX 750, when the presence of buffers is beneficial or needed due to some additional design constrains.

MUX 750 operates to multiplex sequence 722, data stream 732, and data stream 716 to generate a corresponding bit-word sequence 752. Each bit-word of sequence 752 has m (=$m_s$+$m_u$+1) bits. The sign bit of the bit-word carries the corresponding bit provided by data stream 716. The amplitude bits of the bit-word carry the corresponding $m_a$ bits provided by streams 722 and 732, with the m MSBs being provided by the corresponding bit-word of stream 722, and the $m_u$ LSBs being provided by the corresponding bit-word of stream 732.

Constellation mapper 760 uses an operative constellation to convert sequence 752 into a corresponding constellation-symbol sequence 762. In an example embodiment, constellation mapper 760 can be a conventional IQ mapper that uses two bit-words of sequence 752 to generate a corresponding QAM constellation symbol for sequence 762. In some other embodiments, constellation mapper 760 can be a conventional PAM mapper that uses one bit-word of sequence 752 to generate a corresponding PAM constellation symbol for sequence 762.

K-way switch 770 enables circuit 700 to map the constellation symbols of sequence 762 onto different tones (carrier frequencies) of modulated electrical signal 242 (FIG. 2). In an example embodiment, K QAM (or PAM) symbols of sequence 762 can be mapped onto K tones by appropriately toggling switch 770.

In an embodiment configured to use a single carrier frequency, switch 770 can be absent.

Figure 8:
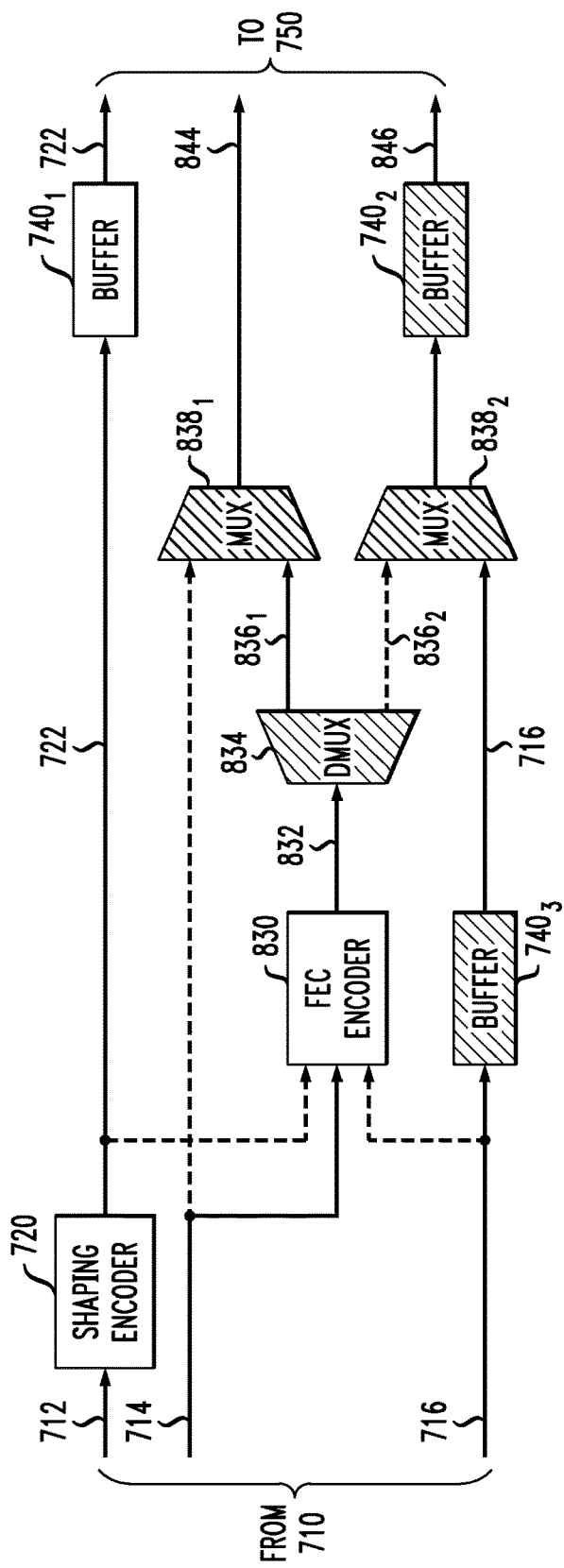
FIG. 8 shows a block diagram of a digital circuit that can be used to implement a portion of the digital circuit of FIG. 7 according to an embodiment.

FIG. 8 shows a block diagram of a digital circuit 800 that can be used in digital circuit 700 (FIG. 7) according to an embodiment. More specifically, circuit 800 can be used to replace the portion of circuit 700 located between DMUX 710 and MUX 750. Circuit 800 is configured to (i) receive data streams 712, 714, and 716 from DMUX 710 and (ii) apply data streams 722, 844, and 846 to MUX 750, with data streams 844 and 846 being applied to the MUX in lieu of data streams 732 and 716, respectively. The relative bit rates of data streams 722, 844, and 846 are as follows: $m_s$:$m_u$:1. Dashed lines and hatched blocks indicate in FIG. 8 the circuit elements that may be optional in some embodiments. Some embodiments may include a subset (i.e., some, but not all) of those optional elements. Various embodiments of circuit 800 can advantageously be used to provide additional flexibility in the FEC-code selection and further ease certain limitations on the code rates.

Circuit 800 comprises an FEC encoder 830 that can be a systematic FEC encoder, such as an LDPC encoder, or a nonsystematic FEC encoder, such a nonsystematic convolutional encoder. FEC encoder 830 differs from FEC encoder 730 in that, in some embodiments, FEC encoder 830 can be configured to operate on a data stream generated using data stream 714 and, optionally, one or both of data streams 716 and 722.

When FEC encoder 830 is a systematic encoder, an output data stream 832 generated thereby carries only parity bits. A DMUX 834 operates to appropriately demultiplex data stream 832 to generate data streams $836_1$ and $836_2$ such that the above-indicated relative bit rates of data streams 722, 844, and 846 can be achieved downstream. A MUX $838_1$ then generates data stream 844 by multiplexing data streams 714 and $836_1$. A MUX $838_2$ similarly generates data stream 846 by multiplexing data streams 716 and $836_2$.

When FEC encoder 830 is a nonsystematic encoder, an output data stream 832 generated thereby carries transformed input data with added redundancy. In this embodiment, MUX $838_1$ is not present, and data stream $836_1$ is used in lieu of data stream 844. In various embodiments, the input data are provided to the nonsystematic FEC encoder 830 by data stream 714 and, optionally, one or both of data streams 716 and 722.

In some embodiments, an additional data buffer, labeled $740_3$, may be needed to appropriately synchronize the various data streams at MUX 750.

Figure 9:
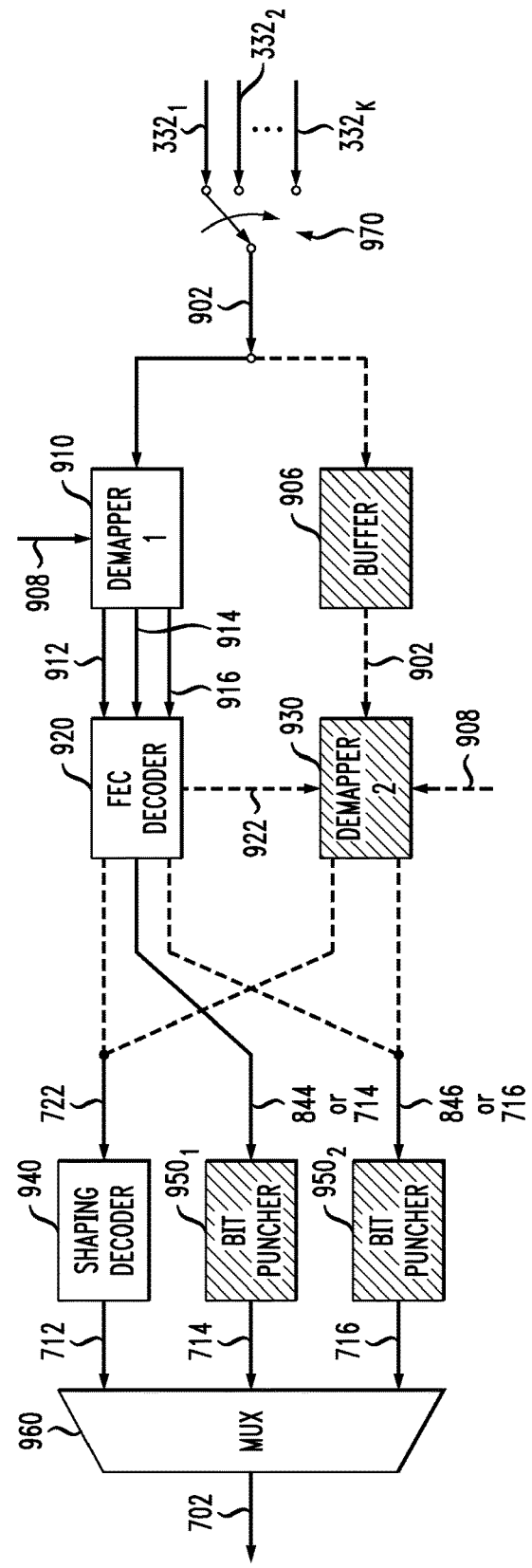
FIG. 9 shows a block diagram of a digital circuit that can be used in the receiver of FIG. 3 according to an embodiment.

FIG. 9 shows a block diagram of a digital circuit 900 that can be used in receiver 300 (FIG. 3) according to an embodiment. More specifically, circuit 900 can be a part of electronic decoder 340. Circuit 900 is configured to recover data stream 702 (also see FIG. 7) in response to receiving digital sequences $332_1$-$332_K$ generated by FFT module 330 of the corresponding receiver 300, e.g., as described above in reference to FIG. 3. Dashed lines and hatched blocks indicate in FIG. 9 the circuit elements that may be optional in some embodiments. Some embodiments may include a subset (i.e., some, but not all) of those optional elements. Various embodiments of circuit 900 can be used to implement electronic encoders 340 compatible with the corresponding electronic encoders 210 implemented using digital circuits 700/800 described above in reference to FIGS. 7-8.

For illustration purposes and without any implied limitations, circuit 900 is described below assuming that the operative constellation is a PAM constellation. From the provided description, a person of ordinary skill in the art will understand how to make and use embodiments of circuit 900 compatible with the use of a QAM constellation.

Circuit 900 comprises a K-way switch 970 configured to generate a stream of digital samples 902 by serializing and directing downstream, in an appropriate order, the digital samples corresponding to the different tones of modulated electrical input signal 302 (FIG. 3) supplied by the received digital sequences $332_1$-$332_K$. A person of ordinary skill in the art will understand that switch 970 implements a carrier demapper. In an embodiment configured to use a single carrier frequency, switch 970 can be absent.

Circuit 900 further comprises a constellation demapper 910 configured to generate data streams 912, 914, and 916 by appropriately processing digital samples 902. In various embodiments, constellation demapper 910 can be a soft demapper or a hard demapper.

In case of a soft demapper 910, some or all of data streams 912, 914, and 916 carry log-likelihood ratios (LLRs). Soft demapper 910 can be configured to perform the calculation of the LLRs as known in the pertinent art, e.g., using prior information 908 of the corresponding amplitude distributions. In an example embodiment, data stream 914 carries $m_u$ LLRs per one digital sample 902, the $m_u$ LLRs corresponding to the amplitude LSBs originally carried at the corresponding transmitter by data stream 732 (FIG. 7) or 844 (FIG. 8). Depending on the embodiment, data stream 912 can carry: (i) $m_s$ LLRs per one digital sample 902, the m LLRs corresponding to the amplitude MSBs originally carried at the corresponding transmitter by data stream 722 (FIG. 7); (ii) m hard bits per one digital sample 902, the m hard bits being (in the absence of errors) the m amplitude MSBs originally carried at the transmitter by data stream 722 (FIG. 7); or (iii) an appropriate number of amplitude MSBs of the corresponding digital sample 902 from which the m amplitude MSBs originally carried at the transmitter by data stream 722 (FIG. 7) can be recovered by the downstream circuits. Depending on the embodiment, data stream 916 can carry: (i) one LLR per one digital sample 902, the one LLR corresponding to the sign bit originally carried at the transmitter by data stream 716 (FIG. 7) or 846 (FIG. 8); (ii) one hard bit per one digital sample 902, the one hard bit being (in the absence of errors) the sign bit originally carried at the transmitter by data stream 716 (FIG. 7) or 846 (FIG. 8); or (iii) an appropriate number of MSBs of the corresponding digital sample 902 from which the sign bit originally carried at the transmitter by data stream 716 (FIG. 7) or 846 (FIG. 8) can be recovered by the downstream circuits.

In case of a hard demapper 910, data streams 912, 914, and 916 carry hard bits. More specifically, data stream 912 carries m hard bits per one digital sample 902, the m hard bits being (in the absence of errors) the m amplitude MSBs originally carried at the transmitter by data stream 722 (FIG. 7). Data stream 914 carries m hard bits per one digital sample 902, the m hard bits being (in the absence of errors) the m amplitude LSBs originally carried at the transmitter by data stream 732 (FIG. 7) or 844 (FIG. 8). Data stream 916 carries one hard bit per one digital sample 902, the one hard bit being (in the absence of errors) the sign bit originally carried at the transmitter by data stream 716 (FIG. 7) or 846 (FIG. 8).

FEC decoder 920 operates to process the data provided by data streams 912, 914, and 916 to correct errors (if any) and recover the data stream 844 (FIG. 8) or 714 (FIG. 7). In some embodiments, FEC decoder 920 can also be configured to recover and output data stream 722 and/or data stream 846 (FIG. 8) or 716 (FIG. 7). In some embodiments, in which demapper 910 is configured to perform only partial constellation demapping, FEC decoder 920 is configured to output a data stream 922 that transfers to a constellation demapper 930 the data that are needed to complete the demapping process, with the data of data stream 922 being derived from data streams 912, 914, and 916 and/or transferred from data streams 912 and 916.

When present, constellation demapper 930 is a hard demapper configured to recover data stream 722 and/or data stream 846 or 716 by appropriately processing data streams 902 and 922. A buffer 906 may be needed to appropriately delay the application of data stream 902 to demapper 930 to appropriately align it time with data stream 922. In some embodiments, demapper 930 can be configured to use some or all of the prior information 908.

In an embodiment in which FEC decoder 920 is configured to output data stream 844, a bit puncher 9501 is used to discard (punch out) from data stream 844 the bits corresponding to data stream $836_1$, thereby reconstructing data stream 714.

In an embodiment in which FEC decoder 920 or demapper 930 is configured to output data stream 846, a bit puncher 9502 is used to discard (punch out) from data stream 846 the bits corresponding to data stream $836_2$, thereby reconstructing data stream 716.

A shaping decoder 940 operates, using the same shaping code used in shaping encoder 720, to convert data stream 722 back into data stream 712.

A MUX 960 operates to properly multiplex the data streams 712, 714, and 716 to recover data stream 702. A person of ordinary skill in the art will understand that the multiplexing operation performed by MUX 960 is inverse to the de-multiplexing operation performed by DMUX 710 (FIG. 7).

Depending on the embodiment of circuit 700 and/or circuit 800 used at the corresponding transmitter, a person of ordinary skill in the art will understand how to select and connect the corresponding subset of the optional (dashed and hashed) circuit elements to make the decoding processing implemented in circuit 900 compatible with (e.g., inverse to) the encoding processing implemented at the transmitter. Example encoder/decoder embodiments that can be constructed in this manner using circuits 700, 800, and 900 are described below in reference to FIGS. 10 and 11.

Figure 10:
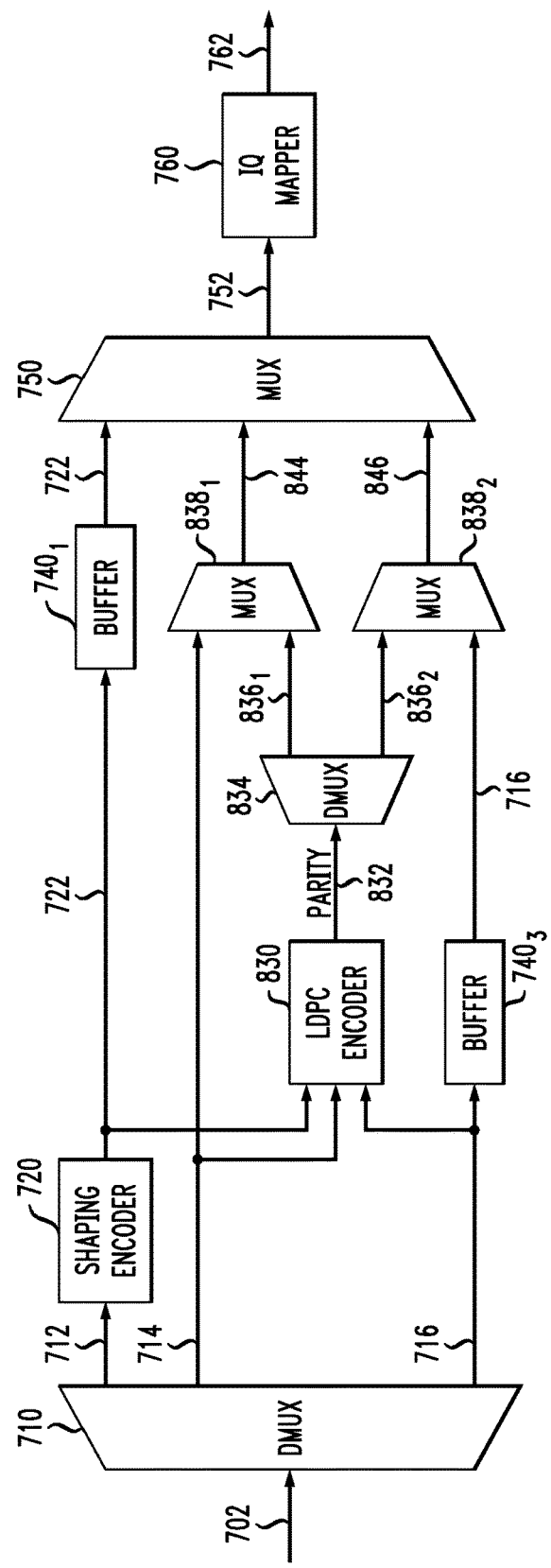
FIG. 10 shows a block diagram of a digital circuit that can be used in the transmitter of FIG. 2 according to another embodiment.

FIG. 10 shows a block diagram of a digital circuit 1000 that can be used in transmitter 200 (FIG. 2) according to an embodiment. More specifically, circuit 1000 is implemented using circuit 700 (FIG. 7), wherein the circuit portion located between DMUX 710 and MUX 750 is replaced by an embodiment of circuit 800.

In circuit 1000, FEC encoder 830 is a systematic LDPC encoder configured to operate on data blocks constructed using data streams 722, 714, and 716 (also see FIG. 8). As such, output data stream 832 generated by LDPC encoder 830 carries only parity bits.

The generally optional DMUX 834, MUX $838_1$, and MUX $838_2$ (see FIG. 8) are present in circuit 1000. As a result, MUX 750 is configured to receive the above-described data streams 722, 844, and 846.

The generally optional buffer $740_2$ (see FIG. 8) is not present in circuit 1000 because the use of buffers $740_1$ and $740_3$ is sufficient to appropriately synchronize the various relevant data streams.

Constellation mapper 760 is implemented in circuit 1000 as an IQ mapper.

Figure 11:
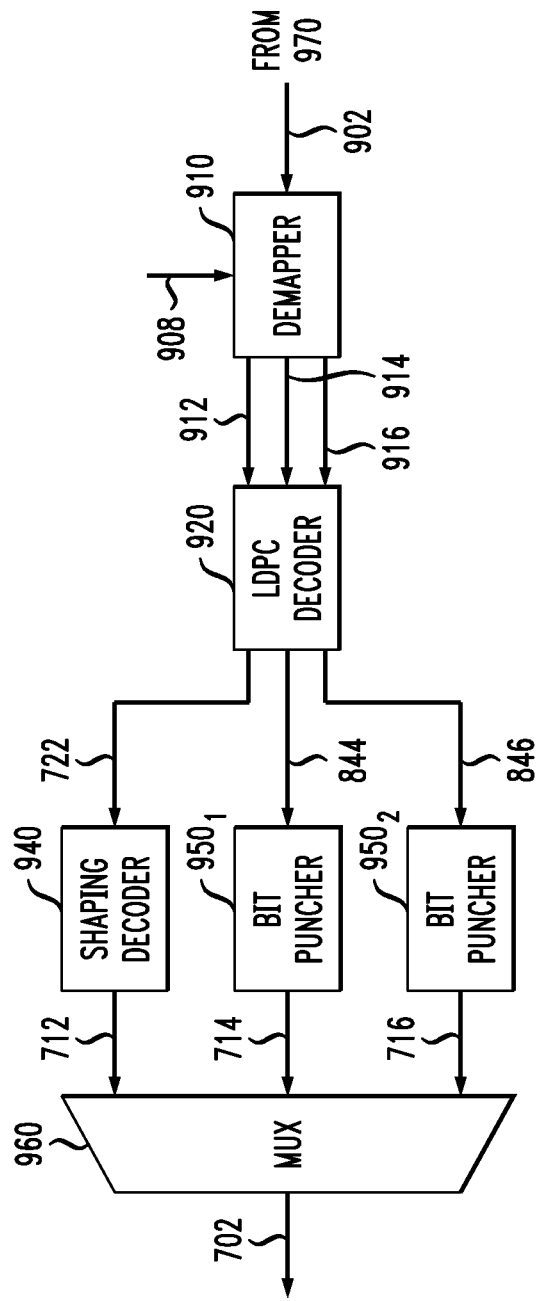
FIG. 11 shows a block diagram of a digital circuit that can be used in the receiver of FIG. 3 according to another embodiment.

FIG. 11 shows a block diagram of a digital circuit 1100 that can be used in receiver 300 (FIG. 3) according to an embodiment. More specifically, circuit 1100 is an embodiment of circuit 900 (FIG. 9). Circuit 1100 can be a part of electronic decoder 340 (FIG. 3) that is compatible with electronic encoder 210 (FIG. 2) implemented using circuit 1000 (FIG. 10).

In circuit 1100, buffer 906 and partial constellation demapper 930 are not present (also see FIG. 9). Constellation demapper 910 is configured to generate data streams 912, 914, and 916 according to a suitable one of the possible configuration options indicated above in reference to FIG. 9. FEC decoder 920 is an LDPC decoder compatible with the LDPC encoder 830 of FIG. 10. As such, LDPC decoder 920 is configured to output data streams 722, 844, and 846. Bit punchers 9501 and 9502 are then used to convert data streams 844 and 846 into data streams 714 and 716, respectively.

Figure 12:
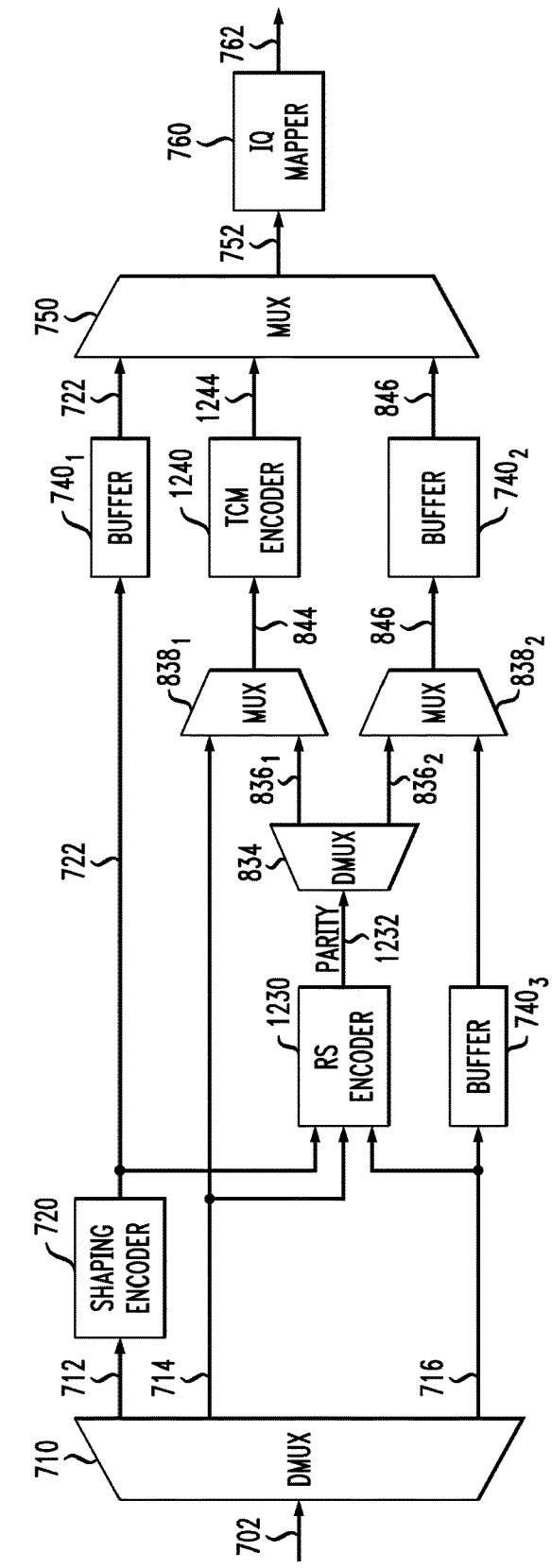
FIG. 12 shows a block diagram of a digital circuit that can be used in the transmitter of FIG. 2 according to yet another embodiment.

FIG. 12 shows a block diagram of a digital circuit 1200 that can be used in transmitter 200 (FIG. 2) according to yet another embodiment. Circuit 1200 is a modification of circuit 1000 (FIG. 10) in which an additional (outer) layer of FEC coding is used to protect data streams 722, 714, and 716. In the example shown in FIG. 12, the outer layer of FEC coding is implemented using a Reed-Solomon (RS) code. A person of ordinary skill in the art will understand that other implementations of the outer layer of FEC coding may use other suitable FEC codes. The following description mostly focuses on the differences between circuits 1200 and 1000.

The additional circuitry incorporated into circuit 1200 includes a TCM encoder 1240. LDPC encoder 830 (FIG. 10) is replaced by an RS encoder 1230. In some embodiments, IQ mapper 760 (see FIG. 10) can be replaced by a suitable TCM mapper. QAM-symbol sequence 762 generated by IQ mapper 760 is typically applied to a suitable carrier mapper, which can be implemented using a switch similar to K-way switch 770 (FIG. 7).

RS encoder 1230 operates to generate a parity data stream 1232 by applying the operative RS code to blocks of bits formed using data streams 722, 714, and 716. Data stream 1232 is then de-multiplexed using DMUX 834 to generate the corresponding data streams $836_1$ and $836_1$. Buffer $740_3$ operates to appropriately align in time the data streams $836_2$ and 716 prior to their application to MUX $838_2$.

In some embodiments, RS encoder 1230 can be configured to generate parity data stream 1232 by applying the operative RS code to blocks of bits formed using some but not all of data streams 722, 714, and 716.

In an example embodiment, TCM encoder 1240 can be configured to apply a conventional TCM code to add further redundancy to data stream 844 and to convert the latter into a data stream 1244. The TCM code can for instance be a convolutional code that encodes three bits of data stream 844 into four bits of data stream 1244. In some embodiments, these four bits of data stream 1244 can be used as LSBs for more than one QAM or PAM symbol. For example, in an embodiment in which the illustrated TCM/RS scheme is used for DSL transport, the 4 bits can be used as the LSBs of two QAM symbols (or of 4 PAM symbols). Each encoding step also depends on the bits encoded in the previous step(s) as known in the pertinent art.

The relative bit rates of data streams 712, 714, and 716 depend on the rates of the codes used by shaping encoder 720, RS encoder 1230, and TCM encoder 1240 and are selected such that the relative bit rates of data streams 722, 1244, and 846 applied to MUX 750 are as follows: $m_s:m_u:1$.

Buffers $740_1$ and $740_2$ operate to appropriately align in time the data streams 722, 1244, and 846 prior to their application to MUX 750.

In some embodiments, circuit 1200 can be configured to use the legacy RS and TCM codes employed in some of the currently used DSL systems.

Figure 13:
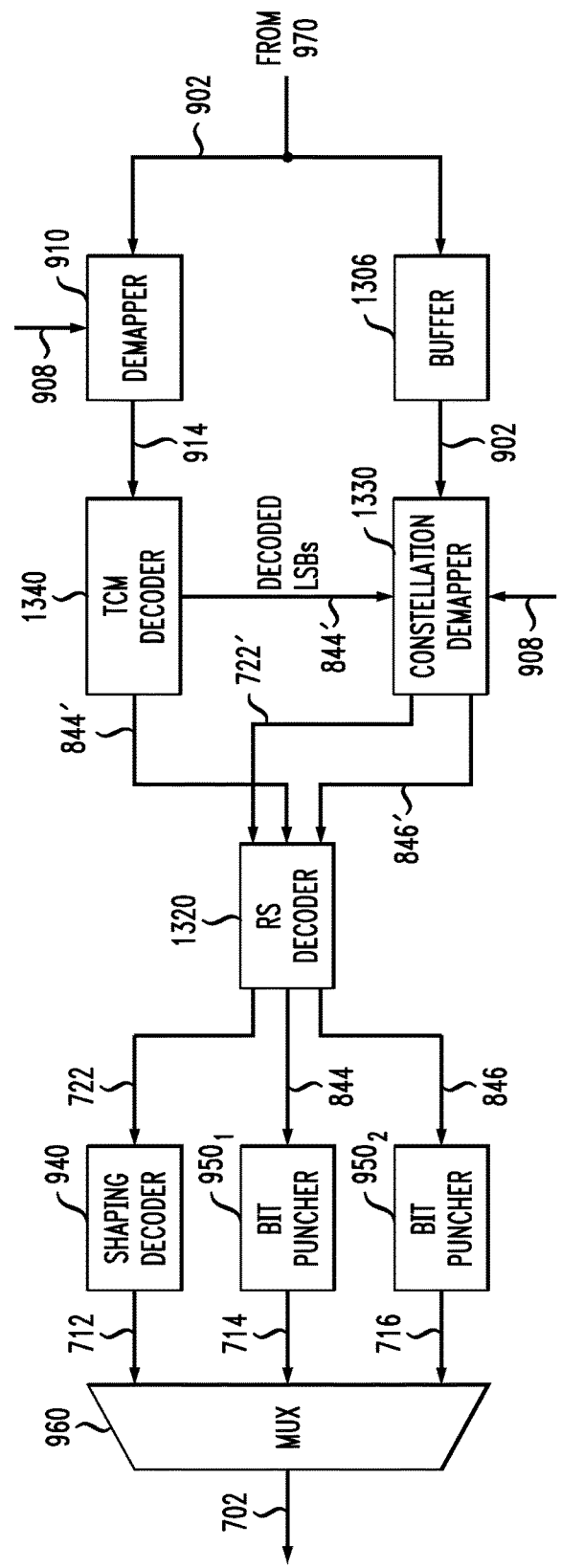
FIG. 13 shows a block diagram of a digital circuit that can be used in the receiver of FIG. 3 according to yet another embodiment.

FIG. 13 shows a block diagram of a digital circuit 1300 that can be used in receiver 300 (FIG. 3) according to yet another embodiment. More specifically, circuit 1300 is a modification of circuit 1100 (FIG. 11), with the modifications being directed at making the decoding processing implemented in circuit 1300 compatible with the encoding processing implemented in circuit 1200 shown in FIG. 12. The following description mostly focuses on the differences between circuits 1300 and 1100.

The additional circuitry incorporated into circuit 1300 includes a buffer 1306, a constellation demapper 1330, and a TCM decoder 1340. LDPC decoder 920 (FIG. 11) is replaced by an RS decoder 1320. Demapper 910 is configured to output the likelihood stream 914 indicative of the TCM-encoded LSBs of data stream 1244 (FIG. 12).

TCM decoder 1340 operates to decode the likelihood stream 914 by applying the inverse transformation to that applied by TCM encoder 1240, thereby generating data stream 844'. Respective copies of data stream 844' are applied to RS decoder 1320 and constellation demapper 1330. Data stream 844' may differ from the original data stream 844 (FIG. 12) due to possible errors. Buffer 1306 operates to appropriately align in time the data streams 844' and 902 prior to their application to constellation demapper 1330.

Constellation demapper 1330 uses the operative constellation(s) used in the constellation mapper 760 (FIG. 12) to complete the demapping process, thereby generating data streams 846' and 722'. Data streams 846' and 722' may differ from the original data streams 846 and 722 (FIG. 12), respectively, due to possible errors.

RS decoder 1320 operates to correct errors (if any) in data streams 844', 846', and 722' using the same RS code used at RS encoder 1230 (FIG. 12), thereby recovering the original data streams 844, 846, and 722. Data streams 844, 846, and 722 are then processed as described above in reference to FIGS. 9 and 11 to recover the original data stream 702.

According to an example embodiment disclosed above, e.g., in the summary section and/or in reference to any one or any combination of some or all of FIGS. 1-13, provided is an apparatus (e.g., 110 or 150, FIG. 1) comprising a data transmitter (e.g., 200, FIG. 2) that comprises an electrical analog front end (e.g., 240, FIG. 2) and a digital signal processor (e.g., 204, FIG. 2), the digital signal processor being configured to: redundancy-encode an input data stream (e.g., 202, FIG. 2; 702, FIGS. 7, 10, 12) to generate a first constellation-symbol stream (e.g., 762, FIGS. 7, 10, 12); and drive the analog front end to cause one or more modulated electrical carriers generated by the analog front end to carry constellation symbols of the first constellation-symbol stream; and wherein the digital signal processor comprises: a first demultiplexer (e.g., 710, FIGS. 7, 10, 12) configured to demultiplex the input data stream to generate a first sub-stream (e.g., 712, FIGS. 7, 10, 12) and a second sub-stream (e.g., 714, FIGS. 7, 10, 12); a shaping encoder (e.g., 720, FIGS. 7, 8, 10, 12) configured to generate a first encoded data stream (e.g., 720, FIGS. 7, 8, 10, 12) by applying a shaping code to the first sub-stream; one or more FEC encoders (e.g., 730, FIG. 7; 830, FIGS. 8, 10; 1230, 1240, FIG. 12) configured to generate a second encoded data stream (e.g., 732, FIG. 7; 844, FIGS. 8, 10; 1244, FIG. 12)

by applying one or more FEC codes to the second substream; and a constellation mapper (e.g., 760, FIGS. 7, 10, 12) configured to use the first and second encoded data streams to select constellation-symbol amplitudes for the first constellation-symbol stream.

In some embodiments of the above apparatus, the constellation mapper is configured to select a constellation-symbol amplitude using a bit-word having a first fixed number (e.g., $m_s$, FIGS. 4-5) of bits supplied by the first encoded data stream and a second fixed number (e.g., $m_u$, FIGS. 4-5) of bits supplied by the second encoded data stream.

In some embodiments of any of the above apparatus, the constellation mapper is configured to perform constellation mapping using a set of binary labels in which different binary labels correspond to different respective constellation points, each binary label including a respective sign portion and a respective amplitude portion, each amplitude portion having a respective set of MSBs and a respective set of LSBs; wherein the first fixed number of bits are used as the respective set of MSBs; and wherein the second fixed number of bits are used as the respective set of LSBs.

In some embodiments of any of the above apparatus, the one or more FEC encoders are further configured to generate a third encoded data stream (e.g., 846, FIGS. 8, 10, 12) by applying the one or more FEC codes to the second sub-stream; and wherein the constellation mapper is configured to use the third encoded data stream to select signs applied to at least some of the constellation-symbol amplitudes.

In some embodiments of any of the above apparatus, the first demultiplexer is further configured to demultiplex the input data stream to generate a third sub-stream (e.g., 716, FIGS. 7, 10, 12); and wherein the constellation mapper is configured to use the third sub-stream to select signs applied to at least some of the constellation-symbol amplitudes.

In some embodiments of any of the above apparatus, the one or more FEC encoders are further configured to generate a third encoded data stream (e.g., 836₂, FIGS. 8, 10, 12) by applying at least one of the one or more FEC codes to the second sub-stream; and wherein the constellation mapper is configured to use the third encoded data stream to select signs applied to at least some of the constellation-symbol amplitudes.

In some embodiments of any of the above apparatus, the one or more FEC encoders (e.g., 830, FIGS. 8, 10; 1230, 1240, FIG. 12) are further configured to generate the second encoded data stream (e.g., 844, FIGS. 8, 10; 1244, FIG. 12) by also applying the one or more FEC codes to the first sub-stream.

In some embodiments of any of the above apparatus, the first demultiplexer is further configured to demultiplex the input data stream to generate a third sub-stream (e.g., 716, FIGS. 7, 10, 12); and wherein the one or more FEC encoders (e.g., 830, FIGS. 8, 10; 1230, 1240, FIG. 12) are further configured to generate the second encoded data stream (e.g., 844, FIGS. 8, 10; 1244, FIG. 12) by also applying at least one of the one or more FEC codes to the third sub-stream.

In some embodiments of any of the above apparatus, the one or more FEC encoders (e.g., 830, FIGS. 8, 10; 1230, 1240, FIG. 12) are further configured to generate the second encoded data stream (e.g., 844, FIGS. 8, 10; 1244, FIG. 12) by also applying at least one of the one or more FEC codes to the first sub-stream.

In some embodiments of any of the above apparatus, the one or more FEC encoders include a systematic FEC encoder.

In some embodiments of any of the above apparatus, the one or more FEC encoders include a convolutional encoder.

In some embodiments of any of the above apparatus, the one or more FEC encoders include a non-systematic FEC encoder.

In some embodiments of any of the above apparatus, the one or more FEC encoders include a Reed-Solomon encoder (e.g., 1230, FIG. 12) and a TCM encoder (e.g., 1240, FIG. 12).

In some embodiments of any of the above apparatus, the digital signal processor further comprises a carrier mapper (e.g., 770, FIG. 7) configured to generate a plurality of constellation-symbol streams (e.g., 212, FIGS. 2, 7) by partitioning the first constellation-symbol stream; and wherein the digital signal processor is configured to drive the analog front end to cause a plurality of the modulated electrical carriers generated by the analog front end to carry the plurality of constellation-symbol streams.

In some embodiments of any of the above apparatus, the apparatus further comprises a modem (e.g., 150, FIG. 1), the modem including the data transmitter.

In some embodiments of any of the above apparatus, the apparatus further comprises a service distribution unit (e.g., 110, FIG. 1), the service distribution unit including the data transmitter.

In some embodiments of any of the above apparatus, the digital signal processor is configured to cause the amplitudes to form two or more amplitude groups (e.g., corresponding to the steps shown in FIG. 5), each of the two or more amplitude groups having at least two different respective amplitudes such that: the different respective amplitudes belonging to a same one of the two or more amplitude groups have a same respective non-zero probability of occurrence; and the amplitudes belonging to different ones of the two or more amplitude groups have different respective non-zero probabilities of occurrence.

According to another example embodiment disclosed above, e.g., in the summary section and/or in reference to any one or any combination of some or all of FIGS. 1-13, provided is an apparatus (e.g., 110 or 150, FIG. 1) comprising a data receiver (e.g., 300, FIG. 3) that comprises an electrical analog front end (e.g., 310, FIG. 3) and a digital signal processor (e.g., 324, FIG. 3), the digital signal processor being configured to process a first stream of values (e.g., one of 332, FIG. 3; 902, FIG. 9) representing one or more modulated carriers of a received electrical signal outputted by the electrical analog front end and corresponding to a first stream of transmitted constellation symbols (e.g., 762, FIGS. 7, 10, 12), the digital signal processor being configured to redundancy-decode the first stream of values to recover a source data stream redundancy-encoded in the first stream of transmitted constellation symbols and carried by the one or more modulated electrical carriers; and wherein the digital signal processor comprises: a constellation demapper (e.g., 910, FIGS. 9, 11, 13) configured to generate a first data stream (e.g., 914, FIGS. 9, 11, 13) by matching each of the first stream of values with at least one constellation point, the first data stream being indicative of amplitude LSBs of binary labels of the first constellation-symbol stream and having a fixed number of amplitude LSBs (e.g., $m_u$, FIGS. 4-5) per binary label; one or more FEC decoders (e.g., 920, FIGS. 9, 11; 1340/1320, FIG. 13) configured to generate a second data stream (e.g., 714, FIGS. 9, 11, 13) by redundancy-decoding the first data stream, the redundancy-decoding being performed using one or more FEC codes; a shaping decoder (e.g., 940, FIGS. 9, 11, 13) configured to generate a third data stream (e.g., 712, FIGS.

9, 11, 13) by decoding a stream of bit-words (e.g., 722, FIGS. 9, 11, 13) indicative of amplitude MSBs of binary labels of the first constellation-symbol stream and having a fixed number of amplitude MSBs (e.g., $m_s$, FIGS. 4-5) per constellation point, the stream of bit-words being generated by processing the first stream of values, the decoding being performed using a shaping code; and a multiplexer (e.g., 960, FIGS. 9, 11, 13) configured to multiplex the second and third data streams to recover the source data stream (e.g., 702, FIGS. 9, 11, 13).

In some embodiments of the above apparatus, the constellation demapper is further configured to generate the stream of bit-words based on the matching.

In some embodiments of any of the above apparatus, the digital signal processor is configured to generate the stream of bit-words by processing the first stream of values using the constellation demapper and at least one of the one or more FEC decoders.

In some embodiments of any of the above apparatus, the digital signal processor further comprises a carrier demapper (e.g., 970, FIG. 9) configured to generate the first stream of values by combining a plurality of streams of values (e.g., 332, FIGS. 3, 9), each stream of the plurality of streams corresponding to a respective one of a plurality of modulated electrical carriers of the received electrical signal.

In some embodiments of any of the above apparatus, the one or more FEC decoders include a systematic FEC decoder.

In some embodiments of any of the above apparatus, the one or more FEC decoders include a convolutional decoder.

In some embodiments of any of the above apparatus, the one or more FEC decoders include a non-systematic FEC decoder.

In some embodiments of any of the above apparatus, the one or more FEC decoders include a Reed-Solomon decoder (e.g., 1320, FIG. 13) and a TCM decoder (e.g., 1340, FIG. 12).

While this disclosure includes references to illustrative embodiments, this specification is not intended to be construed in a limiting sense.

For example, although example embodiments have been described above in reference to LDPC, RS, and TCM codes, other suitable FEC codes can similarly be used instead of or in addition to these codes.

Although example embodiments have been described above in reference to FDM, some embodiments are compatible with single-carrier modulation formats.

Although example embodiments have been described above in reference to a DMT system, some embodiments are compatible with other communication systems, such as those configured to transmit data for other purposes and/or applications.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless explicitly stated otherwise, each numerical value and range should be interpreted as being approximate as if the word "about" or "approximately" preceded the value or range. Also, unless explicitly stated otherwise, each named distribution or function type should be interpreted as being an example as if the words "such as" preceded the distribution or function name.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. Some circuit elements may be implemented using, without limitation, digital signal processor (DSP) hardware, an application specific integrated circuit (ASIC), a field programmable gate array (FPGA), a read only memory (ROM) for storing software, a random access memory (RAM), and non-volatile storage. Other hardware, conventional and/or custom, may also be included.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

What is claimed is:

1. An apparatus comprising a data transmitter that comprises an electrical analog front end and a digital signal processor, the digital signal processor being configured to:
    redundancy-encode an input data stream to generate a first constellation-symbol stream; and
    drive the analog front end to cause one or more modulated electrical carriers generated by the analog front end to carry constellation symbols of the first constellation-symbol stream; and
    wherein the digital signal processor comprises:
        a first demultiplexer configured to demultiplex the input data stream to generate a first sub-stream and a second sub-stream;
        a shaping encoder configured to generate a first encoded data stream by applying a shaping code to the first sub-stream;
        one or more Forward Error Correction (FEC) encoders configured to generate a second encoded data stream by applying one or more FEC codes to the second sub-stream; and
        a constellation mapper configured to use the first and second encoded data streams to select constellation-symbol amplitudes for the first constellation-symbol stream.

2. The apparatus of claim 1, wherein the constellation mapper is configured to select a constellation-symbol amplitude using a bit-word having a first fixed number of bits supplied by the first encoded data stream and a second fixed number of bits supplied by the second encoded data stream.

3. The apparatus of claim 2,
    wherein the constellation mapper is configured to perform constellation mapping using a set of binary labels in which different binary labels correspond to different respective constellation points, each binary label including a respective sign portion and a respective amplitude portion, each amplitude portion having a respective set of Most-Significant Bits (MSBs) and a respective set of Least-Significant Bits (LSBs);
    wherein the first fixed number of bits are used as the respective set of MSBs; and
    wherein the second fixed number of bits are used as the respective set of LSBs.

4. The apparatus of claim 1,
    wherein the one or more FEC encoders are further configured to generate a third encoded data stream by applying the one or more FEC codes to the second sub-stream; and
    wherein the constellation mapper is configured to use the third encoded data stream to select signs applied to at least some of the constellation-symbol amplitudes.

5. The apparatus of claim 1,
    wherein the first demultiplexer is further configured to demultiplex the input data stream to generate a third sub-stream; and
    wherein the constellation mapper is configured to use the third sub-stream to select signs applied to at least some of the constellation-symbol amplitudes.

6. The apparatus of claim 5,
    wherein the one or more FEC encoders are further configured to generate a third encoded data stream by applying at least one of the one or more FEC codes to the second sub-stream; and
    wherein the constellation mapper is configured to use the third encoded data stream to select signs applied to at least some of the constellation-symbol amplitudes.

7. The apparatus of claim 1, wherein the one or more FEC encoders are further configured to generate the second encoded data stream by also applying the one or more FEC codes to the first sub-stream.

8. The apparatus of claim 1,
    wherein the first demultiplexer is further configured to demultiplex the input data stream to generate a third sub-stream; and
    wherein the one or more FEC encoders are further configured to generate the second encoded data stream by also applying at least one of the one or more FEC codes to the third sub-stream.

9. The apparatus of claim 8, wherein the one or more FEC encoders are further configured to generate the second encoded data stream by also applying at least one of the one or more FEC codes to the first sub-stream.

10. The apparatus of claim 1, wherein the one or more FEC encoders include at least one of the following: a systematic FEC encoder; a convolutional encoder; a non-systematic FEC encoder; a Reed-Solomon encoder; and a Trellis-Coded Modulation (TCM) encoder.

11. The apparatus of claim 1,
    wherein the digital signal processor further comprises a carrier mapper configured to generate a plurality of constellation-symbol streams by partitioning the first constellation-symbol stream; and
    wherein the digital signal processor is configured to drive the analog front end to cause a plurality of the modulated electrical carriers generated by the analog front end to carry the plurality of constellation-symbol streams.

12. The apparatus of claim 11, further comprising a modem, the modem including the data transmitter.

13. The apparatus of claim 11, further comprising a service distribution unit, the service distribution unit including the data transmitter.

14. The apparatus of claim 1, wherein the digital signal processor is configured to cause the amplitudes to form two or more amplitude groups, each of the two or more amplitude groups having at least two different respective amplitudes such that:
   the different respective amplitudes belonging to a same one of the two or more amplitude groups have a same respective non-zero probability of occurrence; and
   the amplitudes belonging to different ones of the two or more amplitude groups have different respective non-zero probabilities of occurrence.

15. An apparatus comprising a data receiver that comprises an electrical analog front end and a digital signal processor, the digital signal processor being configured to process a first stream of values representing one or more modulated carriers of a received electrical signal outputted by the electrical analog front end and corresponding to a first stream of transmitted constellation symbols, the digital signal processor being configured to redundancy-decode the first stream of values to recover a source data stream redundancy-encoded in the first stream of transmitted constellation symbols and carried by the one or more modulated electrical carriers; and
   wherein the digital signal processor comprises:
      a constellation demapper configured to generate a first data stream by matching each of the first stream of values with at least one constellation point, the first data stream being indicative of amplitude Least-Significant Bits (LSBs) of binary labels of the first constellation-symbol stream and having a fixed number of amplitude LSBs per binary label;
      one or more Forward Error Correction (FEC) decoders configured to generate a second data stream by redundancy-decoding the first data stream, the redundancy-decoding being performed using one or more FEC codes;
      a shaping decoder configured to generate a third data stream by decoding a stream of bit-words indicative of amplitude Most-Significant Bits (MSBs) of binary labels of the first constellation-symbol stream and having a fixed number of amplitude MSBs per binary label, the stream of bit-words being generated by processing the first stream of values, the decoding being performed using a shaping code; and
      a multiplexer configured to multiplex the second and third data streams to recover the source data stream.

16. The apparatus of claim 15, wherein the digital signal processor further comprises a carrier demapper configured to generate the first stream of values by combining a plurality of streams of values, each stream of the plurality of streams corresponding to a respective one of a plurality of modulated electrical carriers of the received electrical signal.

17. The apparatus of claim 15, wherein the one or more FEC decoders include at least one of the following: a systematic FEC decoder; a convolutional decoder; a non-systematic FEC decoder; a Reed-Solomon decoder; and a Trellis-Coded Modulation (TCM) decoder.

* * * * *